(12) United States Patent
Kumar et al.

(10) Patent No.: US 12,048,884 B2
(45) Date of Patent: Jul. 30, 2024

(54) ACCELERATED GAME ENGINE FOR FOUR-PLAYER ELECTRONIC GAME

(71) Applicant: Quaternity, LLC, Burbank, CA (US)

(72) Inventors: Shreyas Kumar, San Francisco, CA (US); Alan Turower, Gdańsk (PL); Krysztof Pikora, Gdańsk (PL); Michal Kaplon, Wroclaw (PL); Dawid Zwolinski, Rumia (PL)

(73) Assignee: Quaternity, LLC, Burbank, CA (US)

( * ) Notice: Subject to any disclaimer, the term of this patent is extended or adjusted under 35 U.S.C. 154(b) by 133 days.

(21) Appl. No.: 17/967,521

(22) Filed: Oct. 17, 2022

(65) Prior Publication Data

US 2024/0123326 A1    Apr. 18, 2024

(51) Int. Cl.
*A63F 13/00* (2014.01)
*A63F 3/02* (2006.01)
*A63F 13/44* (2014.01)
*A63F 13/47* (2014.01)
*A63F 13/822* (2014.01)

(52) U.S. Cl.
CPC .............. *A63F 3/02* (2013.01); *A63F 13/44* (2014.09); *A63F 13/47* (2014.09); *A63F 13/822* (2014.09)

(58) Field of Classification Search
CPC .......... A63F 13/45; A63F 13/44; A63F 13/75; A63F 13/00; A63F 13/822; A63F 13/56
See application file for complete search history.

(56) References Cited

U.S. PATENT DOCUMENTS

| | | | |
|---|---|---|---|
| 9,592,441 B2* | 3/2017 | Hansson | A63F 13/533 |
| 9,687,729 B2* | 6/2017 | Hansson | A63F 13/55 |
| 2006/0279042 A1 | 12/2006 | Stevenson et al. | |
| 2007/0040330 A1* | 2/2007 | Robinson | A63F 3/02 |
| | | | 273/243 |
| 2008/0237983 A1 | 10/2008 | Chien | |
| 2009/0017889 A1 | 1/2009 | Zhukov et al. | |
| 2010/0160038 A1* | 6/2010 | Youm | A63F 13/45 |
| | | | 463/29 |
| 2014/0073389 A1 | 3/2014 | Barker et al. | |
| 2016/0296833 A1 | 10/2016 | Bobadilla | |

(Continued)

OTHER PUBLICATIONS

PCT Invitation to Pay Additional Fees, PCT Application No. PCT/US2023/035249, Dec. 1, 2023, two pages.

(Continued)

*Primary Examiner* — David L Lewis
*Assistant Examiner* — Eric M Thomas
(74) *Attorney, Agent, or Firm* — Fenwick & West LLP

(57) ABSTRACT

An accelerated game engine is described for calculating and illustrating legal moves for an active player's pieces. The game engine obtains a game state of the four-player chess game describing positions of pieces. The game engine removes a first branch of calculations including moves placing a captain piece of the first active player in check. The game engine further removes and/or retains branches of calculations relating to moves based on whether the King is in check. The client device can display a graphical user interface illustrating the board and the pieces. In response to receiving a selection of a piece to move by the first active player, the client device illustrates, via the graphical user interface, valid moves of the selected piece.

20 Claims, 10 Drawing Sheets

(56) References Cited

U.S. PATENT DOCUMENTS

2017/0266567 A1    9/2017   Thomas

OTHER PUBLICATIONS

Chaboissier, J., et al., "RealTimeChess: Lessons from a Participatory Design Process for a Collaborative Multi-Touch, Multi-User Game," Proceedings of the ACM International Conference on Interactive Tabletops and Surfaces, Nov. 13, 2011, pp. 97-106.
PCT International Search Report and Written Opinion, PCT Application No. PCT/US2023/035249, Jan. 26, 2024, 15 pages.

* cited by examiner

ACCELERATED GAME ENGINE FOR FOUR-PLAYER ELECTRONIC GAME

BACKGROUND

This present disclosure generally relates to a game engine for a four-player chess variant game.

Many online platforms currently implement real-time play for the beloved game of chess. These platforms provide an opportunity for players to connect to the platform for real-time play. However, these platforms and the game engines that hosts the chess games are ill suited for hosting real-time play of four-player chess variants, where inputs and calculations exponentially increase with the transition from two players to four. Delayed computations and move registration can greatly affect player experience, especially in timed gameplay.

SUMMARY

An accelerated game engine for hosting multi-player chess games is disclosed. The multi-player games are generally games that include more than two players. In one or more embodiments, the multi-player game is Quaternity Chess. The game engine hosts the gameplay between multiple client devices, each client device associated with a player of the multi-player game. The game engine leverages a legal move checking algorithm that may iteratively maintain valid moves for the pieces of the active players. As a player's turn is completed and their move registered to update the game state, the legal move checking algorithm may update the list of valid moves. With the valid moves cached, the game engine can, in conjunction with a player's client device, illustrate the valid moves for each piece if selected by the player. Illustrating the valid moves may comprise visually identifying the fields that a piece can move to, i.e., a valid move for the selected piece. Visual identification of the fields can include one or more of: placing a symbol on each field, highlighting the fields, bordering the fields, or any other visually distinctive modification.

Figure 1:
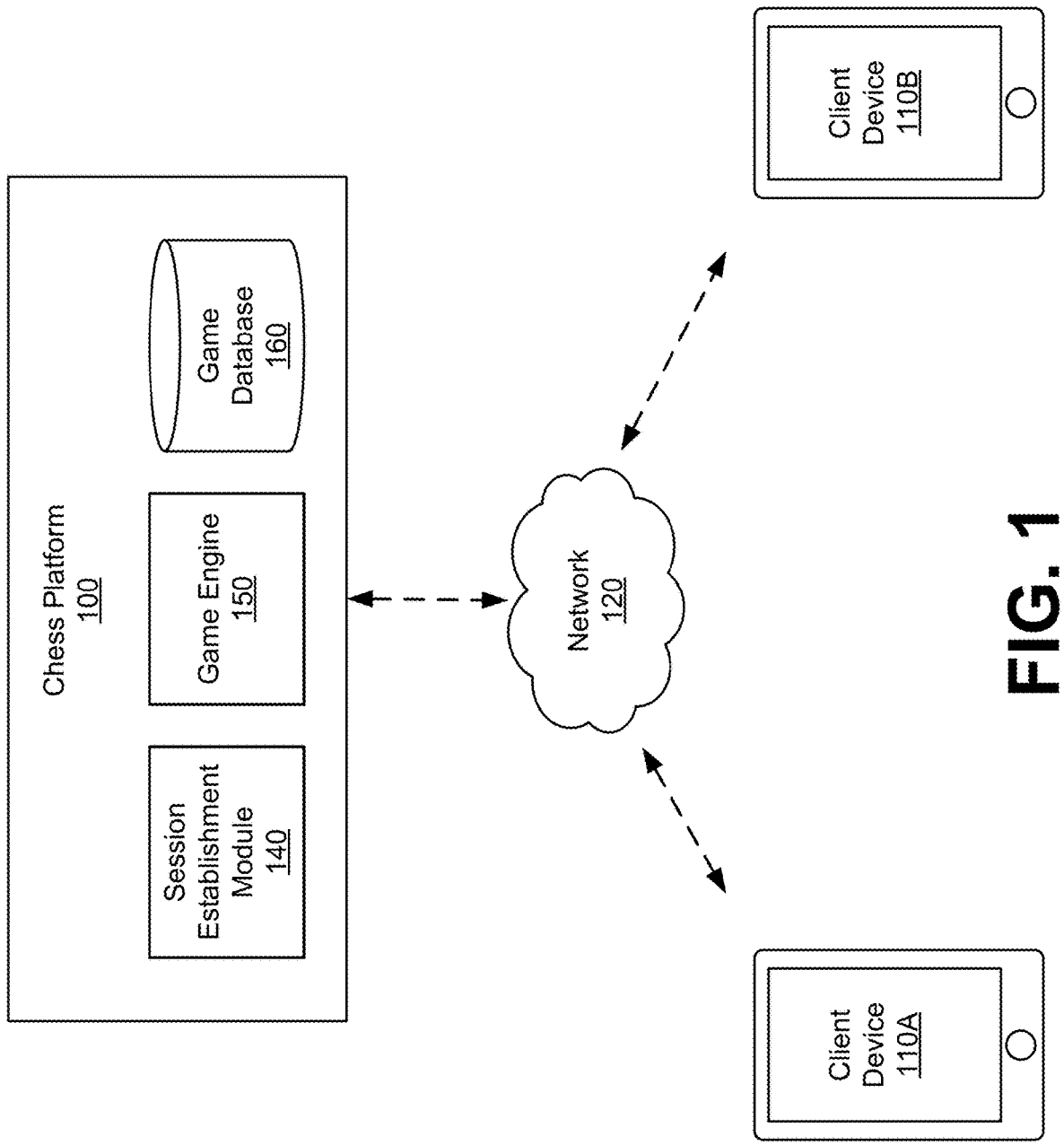
FIG. 1 illustrates a networking environment within which a four-player game engine can host a four-player chess variant game, according to one or more embodiments.

The figures and the following description describe certain embodiments by way of illustration only. One skilled in the art will readily recognize from the following description that alternative embodiments of the structures and methods may be employed without departing from the principles described. Wherever practicable, similar or like reference numbers are used in the figures to indicate similar or like functionality. Where elements share a common numeral followed by a different letter, this indicates the elements are similar or identical. A reference to the numeral alone generally refers to any one or any combination of such elements, unless the context indicates otherwise.

DETAILED DESCRIPTION

Overview

A chess platform hosts online multi-player chess games. The chess platform utilizes a game engine that manages the gameplay of the multi-player chess games. Multi-player chess games may include games with more than two players. The players may be individuals playing through their client device 110 or computer bot players. In some embodiments, the platform hosts the chess variant game called Quaternity Chess. The game engine balances iteratively validating move inputs and evaluating for checks and checkmates to ensure online gameplay is smooth and efficient for the players. Further complexity is injected into the gameplay given the game rules allowing for conquering of opponent pieces when checkmate is delivered. As games progress, the game engine manages tracking of piece movement and player scoring. As a game concludes, the game engine can adjust ratings of the players based on the outcome of the game.

Definitions

A "computer game" may refer to a game hosted on a computing system. The game may be based on physical board games, e.g., Chess, Checkers, etc. Generally, computer games are multi-player, involving two or more players, and may be turn based, wherein the players take turns to play (i.e., to take game actions).

An "online game" may refer to a computer game that connects one or more players via a networking environment. The networking environment may rely on any networking protocols (wireless or wired).

A "game platform" may refer a computer system that hosts an online game. The game platform may comprise a "game engine" that registers move inputs by players, updates the game state, and any other action taken within the game.

A "chess game" may refer to a game based on the real-world game of Chess. A chess game may further refer to variant games that incorporate core elements of the real-world game of Chess with one or more modifications. A chess game generally comprises two or more players, each with their own army of pieces. The army of pieces initialize on fields on a game board (generally a square board). Generally, the goal of the chess game is for the players to eliminate other players. A player is eliminated by checkmate, loss of time, or resignation.

A "four-player chess game" may refer to a chess game that includes four players, whether human players or computer bot players.

A "computer bot" is a player that relies on a computer algorithm to make moves in the game. The computer algorithm providing moves for a computer bot may consider a variety of factors to identify a move to make. Example factors include, other player strength, difficulty level of the computer bot, time control, time left for the computer bot, a randomization factor, etc. The randomization factor may randomly select a move from a selection of candidate moves so as to inject randomness into the computer bot's play. The computer algorithm may prune branches of move calculations based on the above factors. For example, the computer algorithm may, based on a short time control, limit branches of calculations to a low depth of calculation, e.g., each branch of calculations has up to three layers of calculations.

A "piece" may refer to a piece that is controllable by a player. Pieces may include a captain piece (King) and non-captain pieces (Queen, Castle, Bishop, Knight, Pawn, etc.).

A "check" may refer to a first player's army attacking a second player's captain piece (King). When in check, a player's King may escape, move away from the attack, or a player may A "checkmate" may refer to a first player's army delivering a check to a second player that is unescapable by the second player.

Chess Platform Networking Environment

FIG. 1 illustrates a networking environment within which a four-player chess platform 100 can host a four-player chess variant game, according to one or more embodiments. The networking environment provides for the interaction of players using client devices 110 to connect to the chess platform 100 via the network 120. The chess platform 100 may connect to the game database 160 that stores game data used by the chess platform to host games for the players.

The networked computing environment uses a client-server architecture, where one or more client devices 110 communicate with the chess platform 100 via the network 120. The networked computing environment 100 also may include other external systems such as sponsor/advertiser systems or business systems. Although two client devices 110A & 110B are illustrated in FIG. 1, any number of client devices 110 (including just one client device 110) or other external systems may be connected to the chess platform 100 over the network 120.

The chess platform 100 hosts multi-player chess games between the client devices 110. The chess platform 100 can be a general computing device. The chess platform 100 may include a session establishment module 140, a game engine 150, and a game database 160. The session establishment module 140 establishes sessions between the client devices 110 and the game engine 150. Through a session, the game engine 150 can receive input from the player via their client device 110, and the game engine 150 can provide updates to the client device 110. The game database 160 stores data used by the chess platform 160. Example data that may be stored includes past games, player profiles, social network posts, player messages, player rating, etc. Generally, the chess platform 100 receives data from the client device 110 for use by the game engine 150, and the chess platform 100 provides updates to the client device 110. In one or more embodiments, the client devices 110 run local game instances, wherein updates by the game engine 150 update the local game instance. The chess engine 150 is described in greater detail below, with reference to FIG. 2.

A client device 110 can be any portable computing device that can be used by a player to interface with the chess platform 100. For instance, a client device 110 can be a wireless device, a personal digital assistant (PDA), portable gaming device, cellular phone, smart phone, tablet, navigation system, handheld GPS system, wearable computing device, a display having one or more processors, or other such device. In another instance, the client device 110 includes a conventional computer system, such as a desktop or a laptop computer. Still yet, the client device 110 may be a vehicle with a computing device. In short, a client device 110 can be any computer device or system that can enable a player to interact with the chess platform 100. As a computing device, the client device 110 can include one or more processors and one or more computer-readable storage media. The computer-readable storage media can store instructions which cause the processor to perform operations. The client device 110 is preferably a portable computing device that can be easily carried or otherwise transported with a player, such as a smartphone or tablet. Various embodiments of the client device 110 are described in greater detail below, with reference to FIG. 2.

In one or more embodiments, the client device 110 runs a mobile gaming application that connects to the chess platform 100. The mobile gaming application can push and pull game data. Data pulled down may include updates regarding a current game, e.g., as other players make moves, the client device 110 can update a local game instance with the other player move. Data pushed to the chess platform 100 may include actions taken by the player of the client device 110, e.g., a message to other players, a move input, etc.

The network 120 can be any type of communications network, such as a local area network (e.g., intranet), wide area network (e.g., Internet), or some combination thereof. The network can also include a direct connection between a client device 110 and the chess platform 100. In general, communication between the chess platform 100 and a client device 110 can be carried via a network interface using any type of wired or wireless connection, using a variety of communication protocols (e.g., TCP/IP, HTTP, SMTP, FTP), encodings or formats (e.g., HTML, XML, JSON), or protection schemes (e.g., VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel. Furthermore, the networked computing environment 100 may contain different or additional elements and functionality may be distributed between the client device 110, server 100, database 140, and image matching system 140 in a different manner than described.

In situations in which the systems and methods discussed herein access and analyze personal information about players, or make use of personal information, such as location information, the players may be provided with an opportunity to control whether programs or features collect the information and control whether or how to receive content from the system or other application. No such information or data is collected or used until the player has been provided meaningful notice of what information is to be collected and how the information is used. The information is not collected or used unless the player provides consent, which can be revoked or modified by the player at any time. Thus, the player can have control over how information is collected about the player and used by the application or system. In addition, certain information or data can be treated in one or more ways before it is stored or used, so that personally identifiable information is removed. For example, a player's identity may be treated so that no personally identifiable information can be determined for the player.

Figure 2:
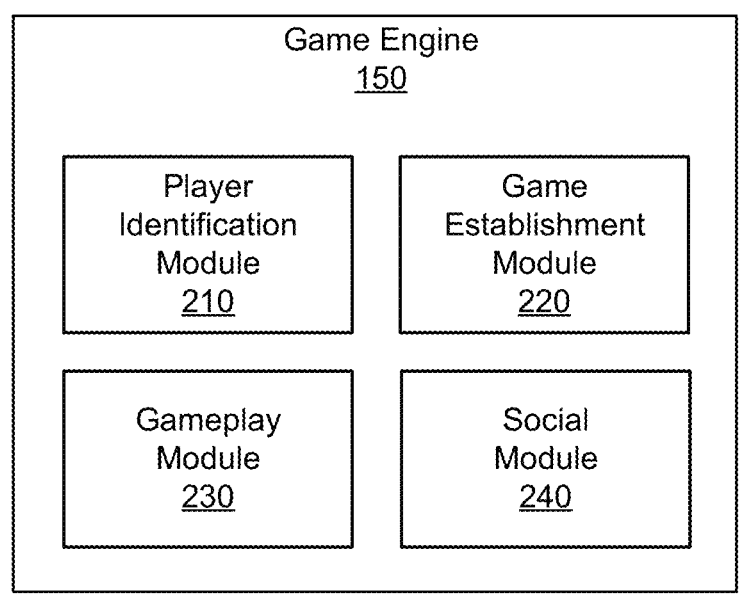
FIG. 2 illustrates a block diagram of the game engine, according to one or more embodiments.

FIG. 2 illustrates a block diagram of the game engine 150, according to one or more embodiments. The game engine 150 includes a player identification module 210, a game establishment module 220, a gameplay module 230, and a social module 240. In other embodiments, the game engine 150 can include a different set of modules with additional or fewer functionality. For example, the game engine 150 may include just the gameplay module 230, e.g., to host a single player playing against 3 bots. In other embodiments, the functionality described for each module may be variably distributed amongst the modules of the game engine 150.

The player identification module 210 identifies players. When the client device 110 establishes a session with the chess platform 100, the player identification module 210 may identify a player profile for the player, e.g., based on login information provided via the client device 110. The player identification module 210 may identify the player profile and load any notifications for the player profile, e.g., communications between other players, outcomes of games, upcoming events, etc. In some embodiments, the player may not have an associated profile, and the player identification module 210 may generate a player profile based on information provided by the player, e.g., player username, player country of residence, player contact information, etc.

The game establishment module 220 establishes games between players. The game establishment module 220 queues players that have requested to play a game. The game establishment module 220 may consider a variety of factors when pairing players together for a game. For example, a client device 110 may want to play any available game, the most open game request. In other examples, the client device 110 may select from a list of open games (created by other players), and the game establishment module 220 may fill open positions in the in the open games. In other examples, no game is presently open, and the game establishment module 220 may create a new game with the requesting client device 110, to wait for other players to fill the other positions. In some embodiments, the play request may further restrict the types of games the player may want to play. For example, the play request includes a specific time control from a plurality of time controls (e.g., hyperbullet, bullet, blitz, rapid, classical, etc.). The play request may further request a specific rating range. In other embodiments, the game establishment module 220 may optimize pairings based on parameters such as client device 110 location, client device 110 server, client device 110 ping with the chess platform 100, player rating, duration of queuing (filling in earlier requests before later requests), etc.

The gameplay module 230 manages the gameplay between client devices 110. Once a game is established, the game establishment module 220 may pass the game over to the gameplay module 230 for hosting the game. The gameplay module 230 processes move inputs by the players, evaluates checks and checkmates, illustrates valid moves, scores games, adjusts player rating, among various other operations to complete the game. The various operations of the gameplay module 230 are further described in FIGS. 4-9.

In order to maintain synchronization and integrity of the game state, the gameplay module 230 may coordinate validation of move inputs across the game engine 150 and the client devices 110. The gameplay module 230 may validate the moves while the client device 110 may cache partial game states. The client device 110 caching partial game states provides for fast response time when a player submits a move input. The gameplay module 230 validating the moves may operate in a stateless mode, i.e., independent of database synchronicity. The gameplay module 230 may further perform the move calculations using bitsets, which are low level data structures to represent the board and associated calculations. The gameplay module 230 may also implement a publisher-subscriber (pub-sub) architecture that pushes out validated moves to the client devices 110. In the pub-sub architecture, the client devices 110 are subscribed to the publisher or the particular game. As the gameplay module 230 validates moves, the gameplay module 230 may publish the validation, which is pushed out to the subscribed client devices 110. Utilizing the pub-sub architecture ensures precision in clock synchronization across client devices 110 connected to the same game.

The social module 240 manages social interactions on the chess platform 100. The social module 240 updates player profiles based on input to update information (e.g., changing a profile picture), games played, communications received, accolades earned, etc. The social module 240 may also manage a content feed comprising, but not limited to, player posts, player achievements or accolades, content by the chess platform 100, or some combination thereof.

Figure 3:
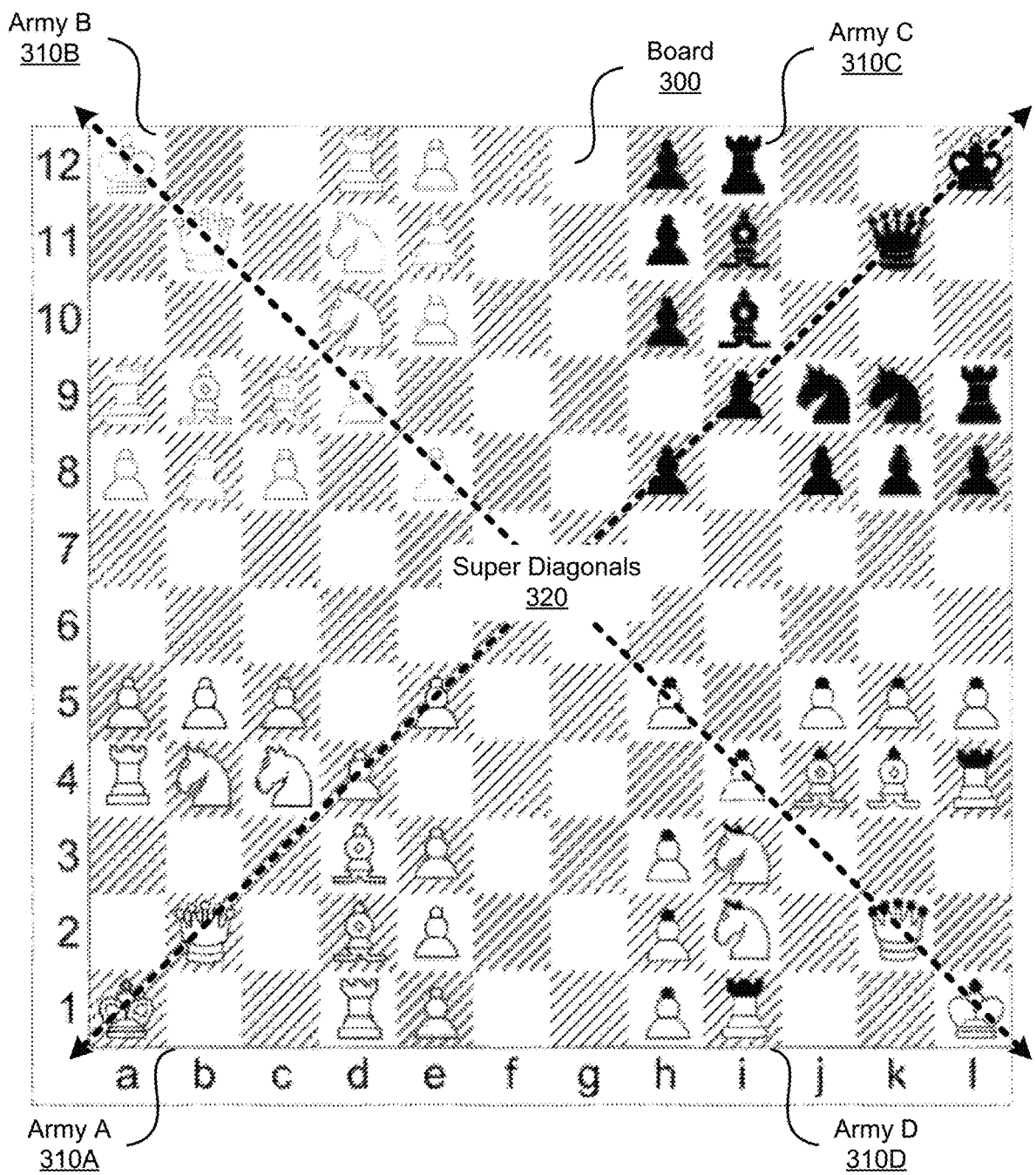
FIG. 3 illustrates an exemplary board and set of pieces for the four-player chess variant entitled Quaternity Chess, according to one or more embodiments.

FIG. 3 illustrates an exemplary board 300 and set of pieces for the four-player chess variant entitled Quaternity Chess, according to one or more embodiments. The board 300 is a 12-by-12 board with checkered squares. Four armies 310 fill the board 300, each set up in 5-by-5 quadrant. With the central two ranks and central two files empty of pieces to start. There are super diagonals 320 that cross through the center of the board 300. A pawn that starts along a super diagonal 320 is termed an advanced central pawn. The direction of movement of pawns may be denoted by small caret-like arrows. The advanced central pawns can move along the super diagonals 320 until committed to moving along rank or file. Turns may go around clockwise, e.g., starting with Army A 310A, then Army B 310B, then Army C 310C, then Army D 310D, then cycling through until the end of the game. A "check" is when one army's piece is attacking another army's King. A "checkmate" occurs when an army's King is in check, but the player being checked has no legal moves to resolve the check. When one army checkmates another army, the checkmated army is converted to the checkmating army. The checkmated King is removed, and the remaining pieces of the checkmated army are converted to belong to the checkmating army. As such, one way of resolving a check is by checkmating the King of the checking army, such that the checking army's pieces are converted to the checkmating army. Quaternity Chess is further described in U.S. Patent Application Publication No. 2015/0352433 A1 entitled "Quaternity Chess" filed on Jun. 9, 2015 by Vorobiev, which is incorporated by reference in its entirety.

Exemplary Gameplay Methods

Figure 4:
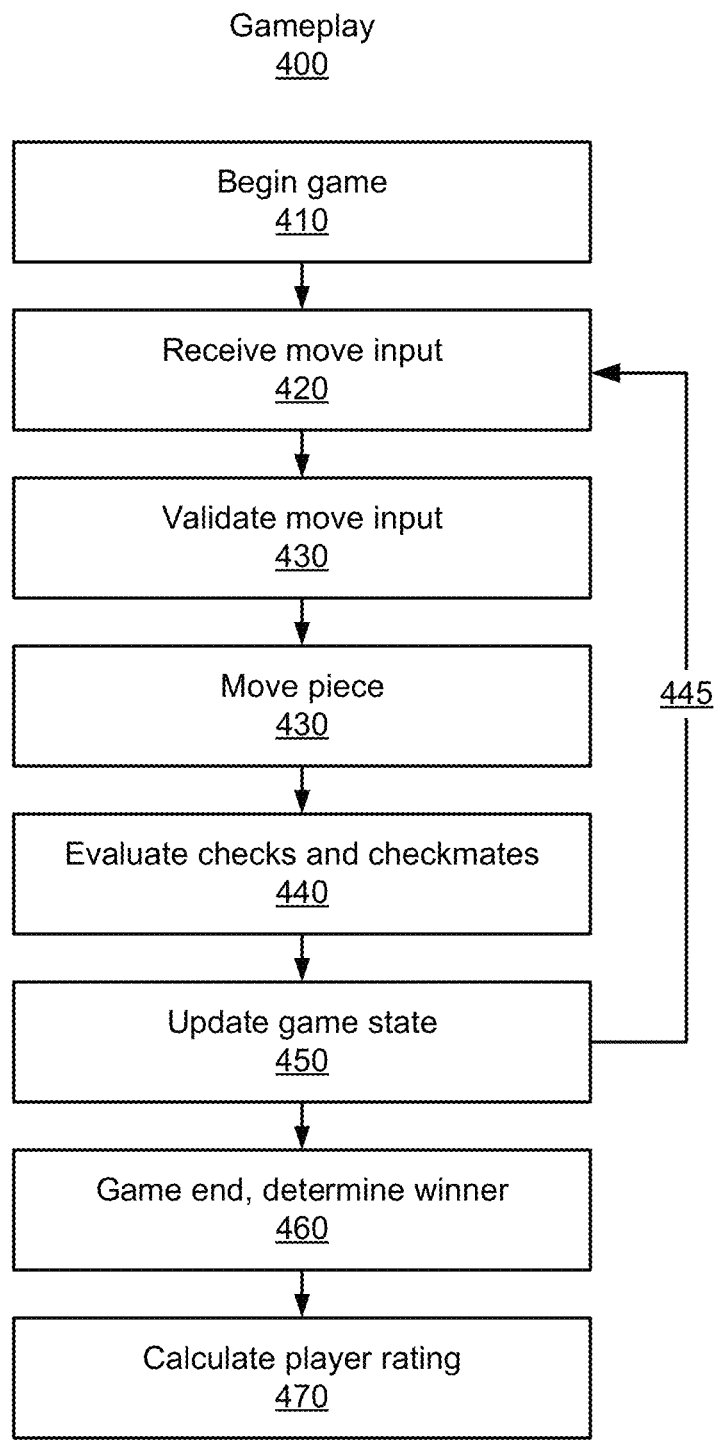
FIG. 4 illustrates an overall flowchart of the game engine hosting gameplay, according to one or more embodiments.

FIG. 4 illustrates an overall flowchart of the game engine 150 hosting gameplay 400, according to one or more embodiments. Although the game engine 150 is described as performing the various steps in hosting the gameplay 400, it can be understood that any component or sub-component of the chess platform 100 may be performing each of the steps.

The game engine 150 begins 410 a multi-player chess game. As described above, the game establishment module 220 may establish the game by pairing the players together to commence a game. When all players are assigned (individuals and may include bots), the game establishment module 220 may hand off the game to the gameplay module 230. The game begins by assignment of a player to go first (randomly or a set color always goes first). Each player may be allotted a starting amount of time, or the game may be unlimited.

The game engine 150 may, throughout duration of the game, calculate potential moves for all the active pieces. The game engine 150 may utilize such calculations to quickly validate move inputs received from the players. The ability to quickly validate move inputs enables smooth gameplay among the players. For example, as players make moves in quick succession, pre-calculation of valid moves would ensure the game engine 150 validates the moves without any delay. Delay in the move validation can cause a player to lose time waiting for the game engine 150 to validate the move.

Game calculations are especially complex in a four-player chess game. With a total of four players at the start of the game, the number of calculations is exponentially greater than a conventional two-player chess game. Numerically, a four-player chess game (such as Quaternity Chess) starts with 64 active pieces compared to the convention two-player chess game of 32 active pieces, with 41 possible starting moves for each player. After one round of turns (each player taking a turn), there is a potential 2,825,761 positions that may result from the 41 possible starting moves for each of the players (assuming no captures). Comparatively, in four moves in a conventional chess game, there are 71,582 distinct positions.

The game engine 150 receives 420 a move input from one of the players. The move input includes at least a piece to move and a field to move to. The move input may further include details relating to when the move input was received or a timestamp on the move input, e.g., how long did the player take to make their move. For special moves, the move input may further include additional information, e.g., a pawn is promoting and includes a requested promotion piece (Knight, Bishop, Rook, Queen). Other moves may include offering a draw or resigning.

The game engine 150 validates 430 the move input. The game engine 150 may validate the move input by ensuring it was the player's turn to provide the move input, by ensuring the move input includes a valid move by the player's pieces, checking whether a promotion (if present) is valid, among other validations. If move inputs are invalidated, the game engine 150 can provide an error to the originating client device 110. For example, the client device 110 sought to move out of turn, and an error is returned in response to the move input. As another example, a player is in check, and the move input does not resolve the check, thus another error. In one or more embodiments, the game engine 150 can pre-calculate valid moves for active pieces prior to receiving the move input. The game engine 150 can quickly validate the move input by checking the move input against the pre-calculated valid moves. Move validation is further described in FIGS. 5 & 6.

Upon validation, the game engine 150 moves 430 the piece. The game engine can store a global game state on the chess platform. As the move is validated, the game engine 150 moves 430 the piece on the global game state. The moved piece may the be pushed out to all the client devices 110 for updating local game states maintained at each client device 110. Piece move flow is further described in FIG. 7.

The game engine 150 evaluates 440 checks and checkmates. The game engine 150 evaluates which players are in check based on whether the moved piece from step 430 is attacking enemy Kings. Checkmates are evaluated against whether there is a valid move to resolve a check.

The game engine 150 updates 450 the game state. Updating the game state involves updating consequences of the moved piece 430. Updating the game state may include keeping score for the players. Other updates include resolving consequences to moved pieces 430, promoting a pawn, converting a checkmated army, converting a resigned army, etc. For example, if the piece places another enemy player in checkmate, the game engine 150 proceeds through converting the checkmated pieces. If a player's move was to resign, that player's pieces are now turned into a zombie army. The zombie army continues to occupy the board, e.g., until another player checkmates the zombie army's King. The zombie army does not get a turn. After updating game state, the game engine 150 can provide notifications to update the local game states. For example, the game engine 150 can shoot a notification to the client device 110 originating the move input that the move was registered. The game engine 150 can also notify the remaining client devices 110 of the moved piece and subsequent consequences, e.g., a promotion, a conversion from a checkmate, etc. Updating the game state is further described in FIG. 8.

After processing a move input, the game engine 150 can iteratively 445 process move inputs by the players until game completion. When players lose (e.g., checkmated, resigned, run out of time), that game engine 150 can deactivate that player such that the player can no longer provide move inputs.

At game end, the game engine 150 determines 460 a winner. Once one army remains standing, with all other players checkmated, resigned, or time ran out, the game ends. Games can also end in an agreed upon draw (or other draw conditions). The game engine 150 can score based on which player delivered checkmates against other players. Additional points may be awarded to the first checkmate, last standing, etc. The client devices 110 are notified of the result, e.g., final placement of each player with their score. The game engine 150 can further log the game and the result, e.g., in the game database 160 with a link to the game in each player's profile.

The game engine 150 may further calculate 470 player rating for the players that completed the game. If the game is a rated game, the game engine 150 can calculate a new rating. The rating may be based on an Elo rating same. Generally, players that beat other players above a minimum rating will gain points, and players that lose to other players below a maximum rating will lose points. The calculations may be adjusted based on aggregated statistics across the players, e.g., average player rating, standard deviation, etc. The calculations may also be adjusted based on actions between the players, e.g., Player A checkmated Player B, which may only affect Player A and Player B rather than the other two players, etc.

In one or more embodiments, the game engine 150 may calculate 470 player rating in such a manner as to incentivize higher rated players to play against lower rated players. For example, the game engine 150 can use a scaling factor that inversely scales the rating adjustments based on the player's rating. As such, higher rated players are less affected positively or negatively when playing against lower rated players, whereas lower rated players are more affected when playing against higher rated players. Or as another example, the scaling factor can adjust based on the variance between player ratings. For example, high variance would result in a small scaling factor (e.g., less than one) decreasing the magnitude of rating adjustments, whereas low variance would result in a larger scaling factor (e.g., around or above one) increasing the magnitude of rating adjustments.

In one or more embodiments, the game engine 150 may calculate 470 player rating based on weighting one or more actions. For example, each checkmate is differentially weighted. In a first example implementation, the first checkmate may be weighted highest with the other checkmates equally weighted. In another example implementation, the checkmates are weighted according to order. The first checkmate is weighted highest, the second checkmate is weighted second highest, and so forth with the remaining checkmates. Differential weighting of the player actions creates varying incentives and strategies throughout the game.

Figure 5:
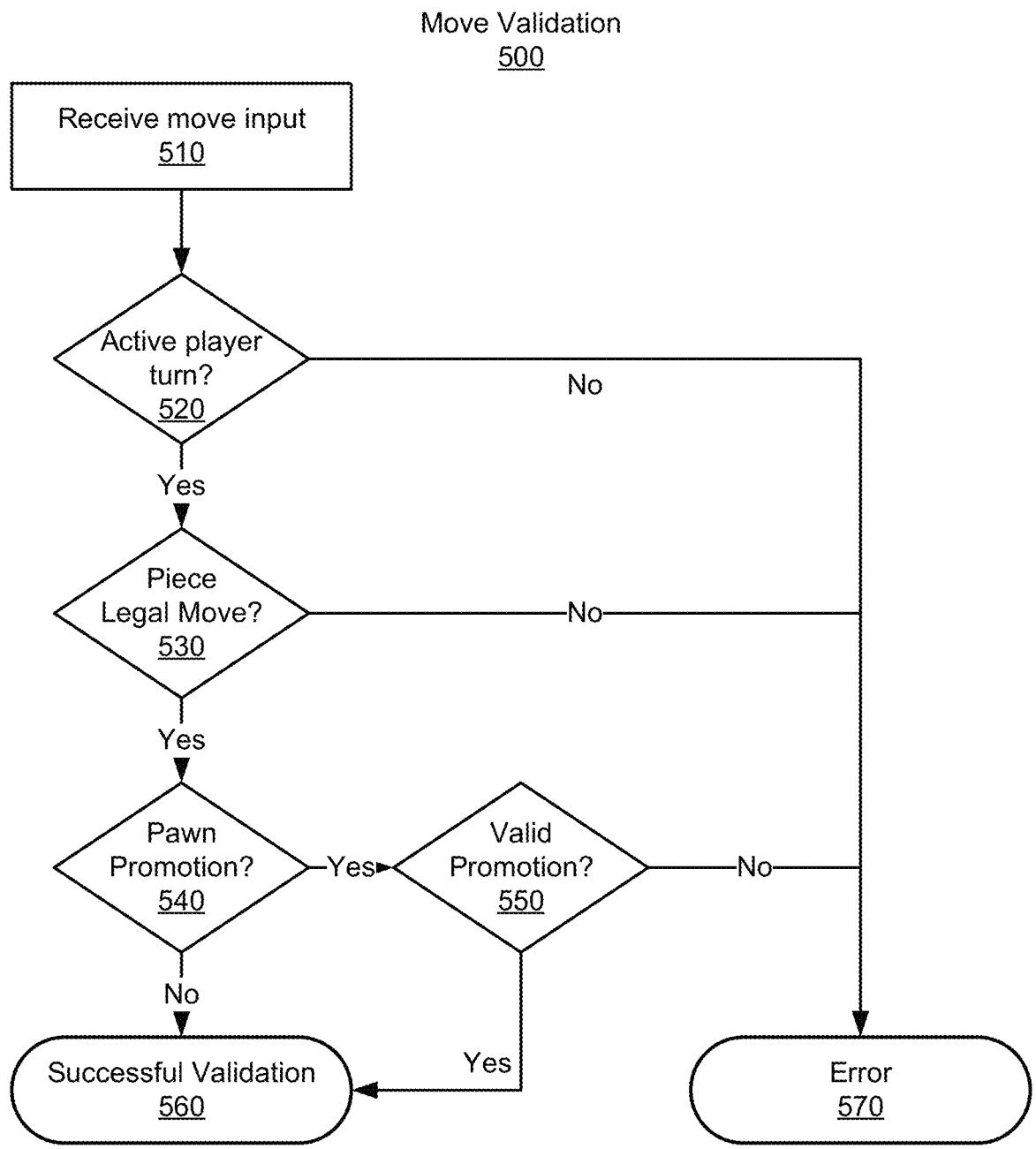
FIG. 5 illustrates a flowchart of move validation by the game engine, according to one or more embodiments.

FIG. 5 illustrates a flowchart of move validation 500 by the game engine 150, according to one or more embodiments. Move validation 500 is an embodiment of the move validation performed as step 430 in the gameplay 400 flowchart of FIG. 4. In one or more embodiments, the client device 110 performs the move validation 500. For example, the client device 110 validates the move input before sending to the chess platform 100 and/or the game engine 150. Invalidated move inputs are rejected by the client device 110, providing quick feedback to the player. In other embodiments, there may be a different arrangement of steps shown, additional steps, or fewer steps (e.g., less optional steps).

The game engine 150 receives 510 a move input. As described elsewhere, the move input includes at least a piece to be moved and a field to move the piece to. In some instances, the move input also or rather describes an action by the player (e.g., offer a draw, resign the game, etc.).

The game engine 150 determines 520 it is the turn of the active player corresponding to the client device 110 that submitted the move input. As turns rotate, the game engine 150 keeps track of which active player's turn it is. The game engine returns an error 570 for move inputs from inactive players. The game engine also returns an error 570 for move inputs from players out of turn.

If determined to be an active player's turn, then the game engine 150 determines 530 whether the move input comprised a legal move. Generally, a legal move is a piece move that falls within a prescribed set of rules for the game. How the game engine 150 determines whether a move is legal is further described in FIG. 6. If the move input corresponded to an invalid move then the game engine 150 returns an error 570. In some embodiments, the determination 530 whether the move input was a legal move is performed on the client device 110.

If determined to be a legal move, then the game engine 150 determines 540 whether the move comprises a pawn promotion. Pawn promotion occurs when a pawn reaches an edge of the board opposite the quadrant that the pawn was initially located. Advanced central pawns may move along the super diagonal, or may move off the super diagonal to commit to moving along a rank or a file. If no pawn promotion, the game engine 150 returns a successful validation 560.

If the move comprises a pawn promotion, then the game engine 150 determines 550 whether the pawn promotion is valid. The game engine 150 checks whether the requested promotion piece is valid. To determine a pawn promotion to be valid, the game engine 150 may check, among other factors, whether the promotion field is available, whether the piece to be promoted to is a valid piece, whether there are any checks against the King, etc. If the promotion is valid, the game engine 150 returns a successful validation 560; and, if the promotion is invalid, then the game engine 150 returns an error 570.

Figure 6:
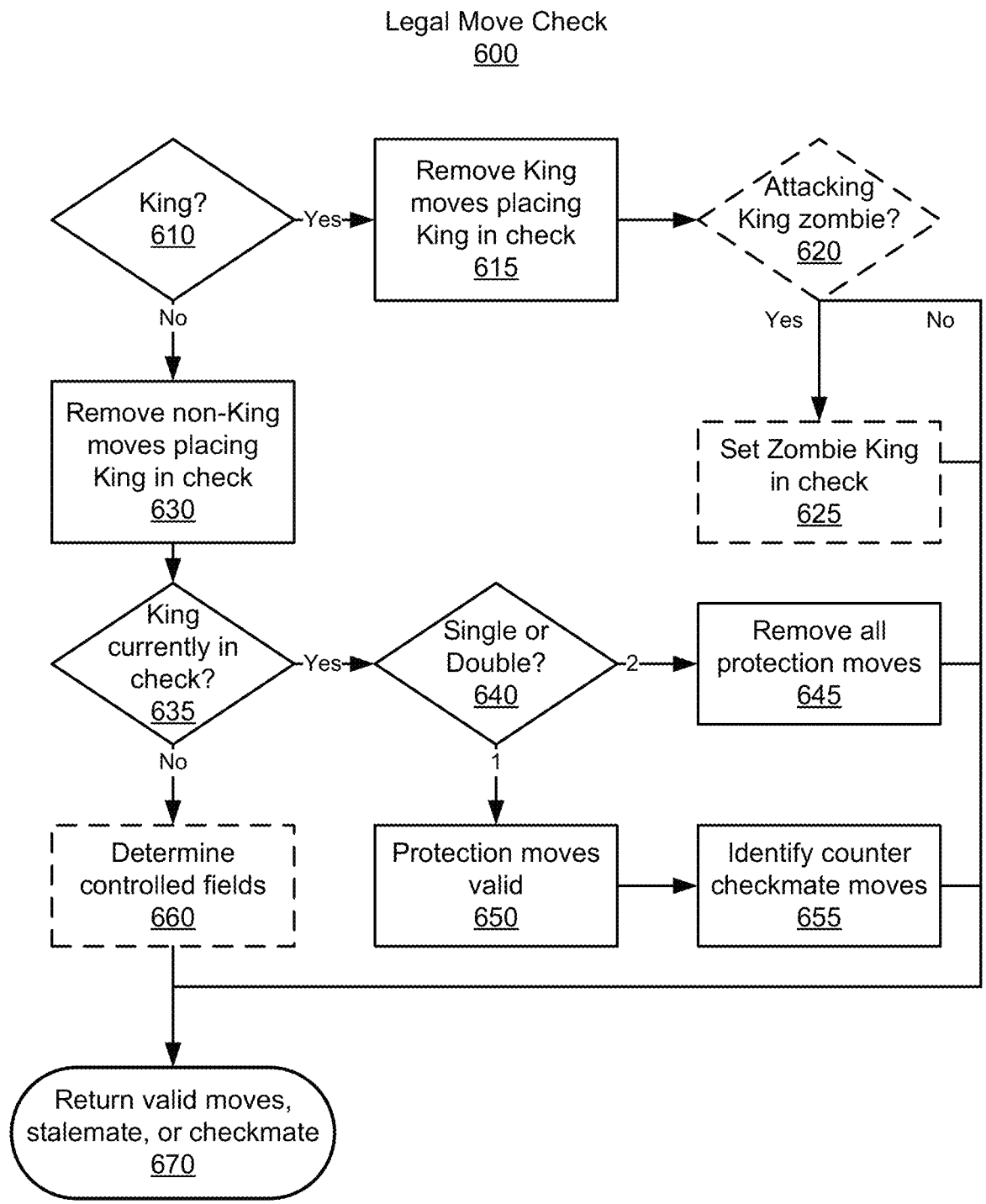
FIG. 6 illustrates a flowchart of legal move check by the game engine, according to one or more embodiments.

FIG. 6 illustrates a flowchart of a legal move check 600 by the game engine 150, according to one or more embodiments. The game engine 150 and/or the client device 110 may perform the legal move check 600 prior to registering the move. The determination at step 530 in FIG. 5 may leverage the legal move check 600 to determine whether the move input is legal. In other embodiments, there may be a different arrangement of steps shown, additional steps, or fewer steps (e.g., less optional steps).

The game engine 150 determines 610 whether the piece to be moved is a King. If the piece is not a King, then the game engine 150 proceeds to step 630. If the piece is a King, the game engine 150 proceeds to step 615.

The game engine 150 removes 615 moves King moves placing the King in check. The King cannot move into a field under control by another enemy piece (King or non-King piece). In circumstances with a zombie King, a player may use their King to convert the zombie army by attacking the King with the player's own King. As such, the game engine 150 determines 620 whether the King move attacks a zombie King. If attacking a zombie King, then the game engine 150 sets 625 the zombie King in check. The game engine 150 can also convert the zombie army, e.g., removing the zombie King, converting remaining zombie pieces to the conquering army.

The game engine 150 removes 630 non-King moves placing King in check. Any non-King piece moves that place the player's own King in check are removed by the game engine 150 as invalid. Piece moves that place the King in check include moves by pieces that unveil the player's King to an attack by an enemy piece.

The game engine 150 further evaluates 635 whether the King is currently in check. If the King is currently in check, the game engine 150 determines 640 whether there is a single check or double checks. A single check occurs when a single enemy piece is attacking the King. Double checks occur when at least two enemy pieces are attacking the King. Double checks can include one check from one enemy army and another check from a second enemy army.

If there are double checks on the King, the game engine 150 removes 645 all protection moves. Protection moves include movement of a non-King piece that blocks the King from an attack and movement a non-King piece that captures the piece placing the King in check. Protection moves are invalid in cases of double checks because the King is attacked from two different directions by two different pieces, and a piece movement is unable to resolve the two or more checks.

If there is a single check on the King, the game engine 150 returns 655 the protection moves as valid. The game engine 150 also identifies 655 counter checkmate moves. A counter checkmate move is a move that checkmates a checking army. For example, Army B's Bishop is currently checking Army A. The game engine 150 identifies a counter checkmate move where Army A can place Army B in checkmate, thereby converting the Army B's Bishop into Army A, and resolving the checkmate.

If the King is not in check, then the game engine 150 may determine 660 controlled fields by the player's pieces. Controlled fields for a piece include fields that the piece may move to or capture. For example, a Bishop located in a corner of the board controls all fields on the super diagonal, unless there is another piece on the super diagonal. If the other piece belongs to the same army, then the occupied field is not presently controlled by the Bishop. If the other piece belongs to a different army, then that piece may be captured, thus the field is controlled by the Bishop. Occupied fields decrease vision of most pieces (except Knights). Controlled fields for a pawn may be broken down into movable fields and capturable fields. Generally, pawns move unidirectionally but capture diagonally. The game engine 150 may cache the controlled fields by a player's army such that subsequent iterations of performing the legal move check 600, e.g., for another player, can rely on the cached controlled fields to decrease valid moves to calculate (e.g., under 615 or 630). For example, if for Army B, the game engine 150, via the cache, identifies field B4 is already controlled by another army's pieces, then the game engine 150 can quickly strike such a field from the King movement in step 615.

The game engine 150 returns 670 valid moves, a stalemate, or a checkmate. For a particular piece, the game engine 150 may return valid moves, e.g., when the game engine is checking whether a move input comprises a legal move at step 530 in FIG. 5. The game engine 150 may also perform the legal move check 600 to exhaustively identify all valid moves that a player may make. The valid moves for a player constantly shifts as the game progresses, as pieces are moved in turn by the players. The game engine 150 may continuously leverage the legal move check 600 to identify valid moves for the players. When a player runs out of valid moves, then the player may be in stalemate or in checkmate. If the player is presently in check without valid moves, then the player is in checkmate. If the player is not presently in check without valid moves, then the player is in stalemate. In a stalemate situation, if there are only two active players, then the game may end, drawn between the two remaining players. If there are more than two active players, the stalemated player may pass their turn.

In some embodiments, the game engine 150 initializes a tree of calculations when the game starts, i.e., based on the starting positions of the pieces. The tree of calculations starts with all possible moves that can occur based on rules regarding movement of each piece. Possible moves include possible movement of pieces, e.g., Bishops move along diagonals, Rooks move along rank or file, etc. The game engine 150 prunes the tree of calculations based on other rules of the game, e.g., checking, checkmating, pawn promotion, countercheckmating, etc.

The game engine 150 can pre-calculate some number of layers deep into the branches of calculations, e.g., 3, 4, 5, 6, 7, 8, 9, or 10. Each branch of calculations includes subsequent possible moves in subsequent turns branching from a move. For example, each possible move by a first player with turn is the starting node of a branch of calculations. As the first player takes a turn, the game engine 150 can begin pruning, i.e., removing or retaining branches of calculations based on the first player's move. For example, the first player makes an initial pawn move, then the game engine 150 can remove branches of calculations stemming from the move, according to the legal move check 600. For example, the game engine 150 can remove a branch of calculations based on movement of a King into check, a branch of calculations based on movement of non-King pieces that place the King in check, etc. Each step of the flowchart may include removing branches of calculations or retaining branches of calculations. As another example, the game engine 150 can, upon determining a player is in check, perform steps 640, 645, 650, and 655 (or some combination thereof) to remove and retain branches of calculations.

The game engine 150 may initialize the tree at some depth (e.g., 3, 4, 5, 6, 7, 8, 9, or 10), and as players make moves, the game engine 150 calculates additional layers as the tree structure is refined. Adding layers of calculations provide for the quick validation of moves. The refinement of the tree of calculations (i.e., by removing or retaining calculations) efficiently utilizes computational resources to only calculate subsequent possible moves stemming from the subset of legal moves.

Figure 7:
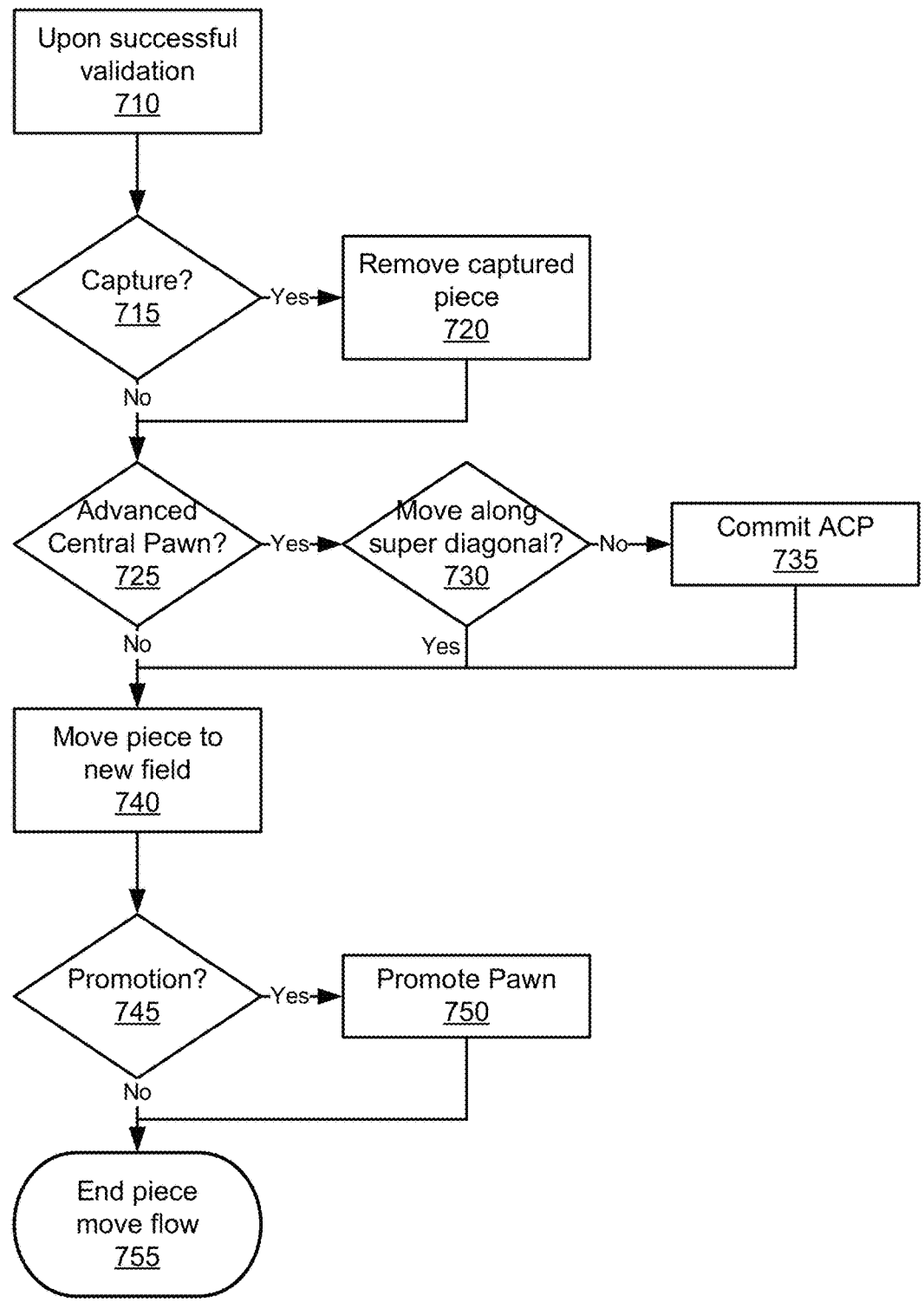
FIG. 7 illustrates a flowchart of piece move flow by the game engine, according to one or more embodiments.

FIG. 7 illustrates a flowchart of piece move flow 700 by the game engine 150, according to one or more embodiments. The game engine 150, upon successful validation 710 (e.g., in step 430 in FIG. 4, via the move validation 500 in FIG. 5), proceeds with performing the piece move flow 700. In other embodiments, there may be a different arrangement of steps shown, additional steps, or fewer steps (e.g., less optional steps).

The game engine 150 evaluates 715 whether the move comprises a capture. If there is a capture, then the game engine 150 removes 720 the captured piece from the board. Note, the captured piece cannot be a King, the game engine 150 may separately process checkmates.

If there was no capture or after the captured piece is removed, then the game engine 150 evaluates 725 whether the moved piece is an advanced central pawn. If the piece is an advanced central pawn, then the game engine 150 further evaluates 730 whether the movement was along the super diagonal. As noted above, advanced central pawns can move along the super diagonal until they move off the super diagonal. Once off the super diagonal, the advanced central pawn acts like a regular pawn, moving unidirectionally and capturing diagonally. Once the advanced central pawn is committed to moving unidirectionally along rank or file, then the advanced central pawn cannot transition back into an advanced central pawn. As such, if the advanced central pawn moved off the super diagonal, then the game engine 150 commits the advanced central pawn to movement along rank or file. If the advanced central pawn remains on the super diagonal, the advanced central pawn can continue to move along the super diagonal.

The game engine 150 moves 740 the piece to the new field. Whether a capture or move without capture, the game engine 150 moves the piece from its originating field to the new field.

The game engine 150 further evaluates 745 whether the move comprises a promotion. If there is a promotion, the game engine 150 promotes the pawn by changing the pawn into the promoted piece (e.g., Knight, Bishop, Rook, or Queen).

Upon completion of the steps in the piece move flow 700, the game engine 150 ends 755 the piece move flow.

Figure 8:
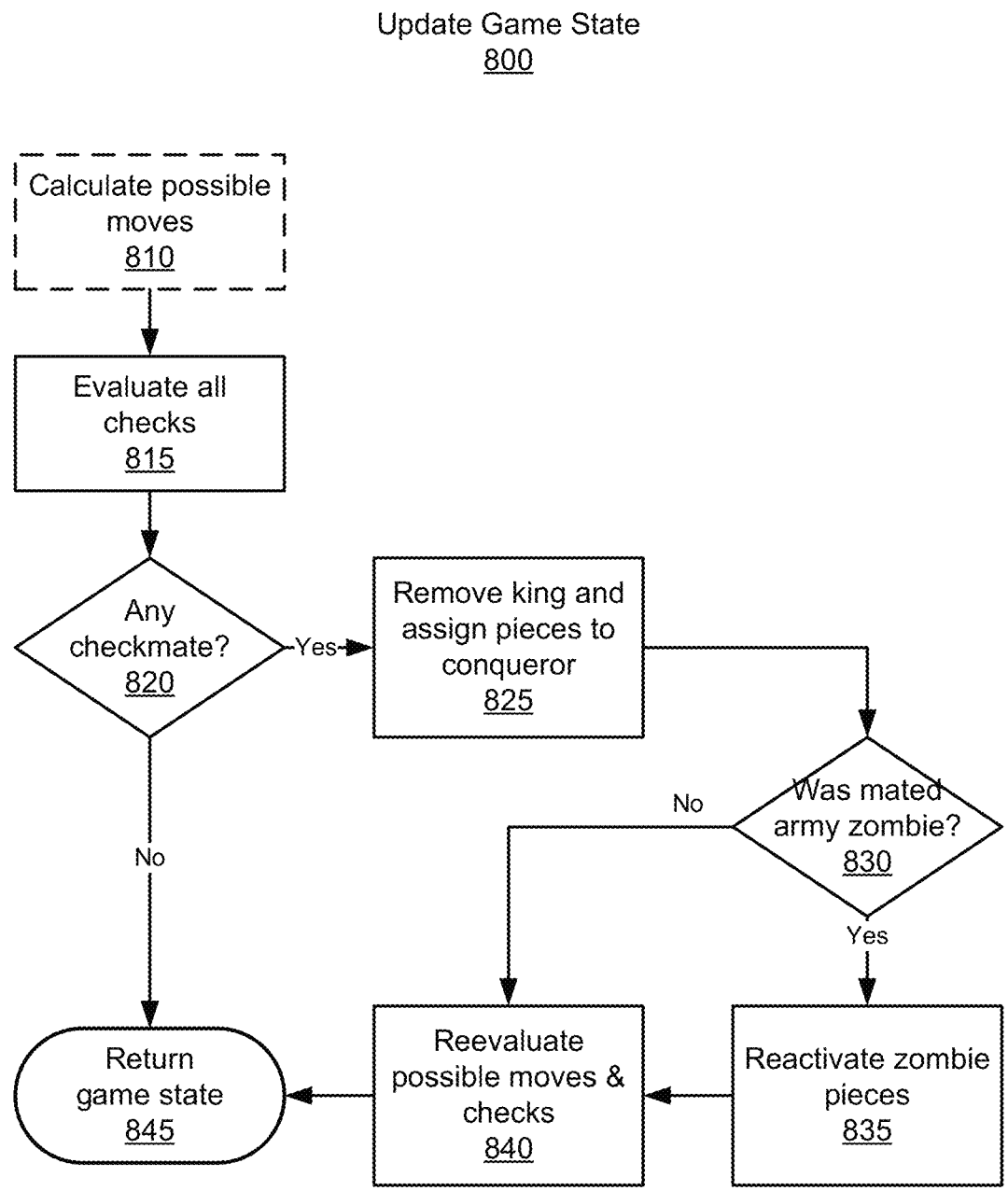
FIG. 8 illustrates a flowchart of updating game state by the game engine, according to one or more embodiments.

FIG. 8 illustrates a flowchart of updating game state 800 by the game engine 150, according to one or more embodiments. The game engine 150 may update the game state 800 as turns are registered and moves made on the global game state. The updating of the game state 800 may be performed for step 450 in FIG. 4. In other embodiments, there may be a different arrangement of steps shown, additional steps, or fewer steps (e.g., less optional steps).

The game engine 150 may calculate 810 possible moves. The game engine 150 may calculate all possible moves for each of the players. The game engine 150 can cache the calculated possible moves for a player. With the cached possible moves, the game engine 150 may utilize the calculated possible moves to evaluate checks and checkmates quicker by checking against fields that are controlled by enemy pieces. For example, if one player is in check, that player's possible moves are limited by the controlled fields by other players. In such embodiments, rather than having to calculate on the fly what fields are controlled by enemy players, the game engine 150 can access the cached possible moves to quickly identify the controlled fields and which moves would be legal to resolve the check.

The game engine 150 evaluates 815 all checks on the Kings. The game engine 150 can identify checks by evaluating the intersection of controlled fields for one player against the other players' King positions (i.e., field that their King occupies). The game engine 150 can tally the number of checks on each King (e.g., for step 640 in FIG. 6 which evaluates how many checks are on a King). For each King that is in check, the game engine 150 may notify that player on their turn that their King is in check, and may further notify that the check must be resolved.

The game engine 150 evaluates 820 whether there are any checkmates. Checkmates may be evaluated after registering movement of the piece (e.g., after step 430 and on step 440 in FIG. 4). The game engine 150 may leverage the legal move check 600 of FIG. 6 to determine whether a checkmate has occurred.

If the game engine 150 determines a checkmate has occurred, the game engine 150 removes 825 the checkmated King and converts the checkmated army's non-King pieces to the checkmating army.

The game engine 150 further evaluates 830 whether the checkmated army was a zombie army. If the game engine 150 determines the checkmated army to be a zombie army, then the game engine 150 can reactivate 835 the zombie pieces, as the zombie pieces were previously deactivated.

Whether or not the checkmated army was a zombie army, the game engine 150 reevaluates 840 possible moves and checks. The game engine 150 could reevaluate the possible moves of the checkmating army with the converted pieces. For example, if Player A checkmates Player B, and one of Player A's pieces was in tension with one of Player B's pieces (both pieces mutually attacking each other), then the tension dissolves with Player B's pieces being converted to belong to Player A. The two pieces in tension would no longer be attacking each other. Likewise, checks by the checkmated army would be assigned over the checkmating army. Following above example, Player B had a Knight checking Player C's King. Post-conversion, the Knight, now belonging to Player A, is checking Player C's King, so the check logged by the game engine 150 can assign the check to now being delivered by Player A.

The game engine 150 returns 845 the updated game state. The game engine 150 may maintain the global game state on server-side, e.g., on the chess platform 100 with the game engine 150. The game engine 150 may log a delta between the prior game state (before performing the update 800) and updated game state. The game engine 150 may push a notification of the delta of activity to the client devices 110. For example, in one turn, Player A moved a Rook to deliver a checkmate to Player B. The game engine 150 can update the client devices 110 with the moved Rook, the checkmate of Player B, and the conversion of Player B's army to Player A.

Figure 9:
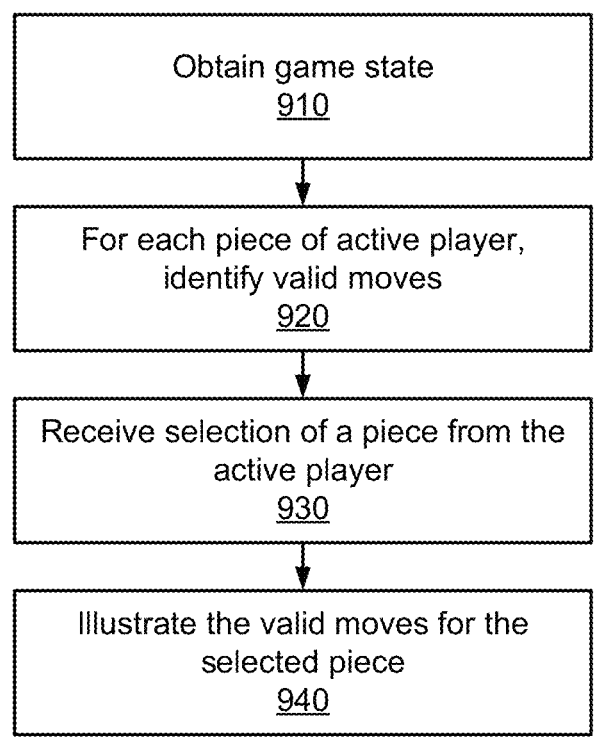
FIG. 9 illustrates a flowchart of valid move illustration by the game engine, according to one or more embodiments.

FIG. 9 illustrates a flowchart of valid move illustration 900 by the client device 110, according to one or more embodiments. The client device 110 may perform each step of the valid move illustration 900. In some embodiments, the game engine 150 may calculate the valid moves for a player's pieces (e.g., via the legal move check 600 of FIG. 6) and provide the valid moves to the client device 110, to illustrate to the player. The client device 110, in other embodiments, calculates the valid moves locally and illustrates those valid moves based on the local calculation. In other embodiments, there may be a different arrangement of steps shown, additional steps, or fewer steps (e.g., less optional steps).

The client device 110 obtains 910 a game state. The game state may be updated by the flowchart of FIG. 8 for updating game state 800. As described elsewhere, the client device 110 may also maintain a local game state that may be updated as the global game state is updated by the game engine 150. The game state may describe a position or a field that each piece of each army is located. The game state may collate information relating to piece position by their corresponding armies. The game state may further specify other related piece information, e.g., advanced central pawns, checks, checkmates, zombie armies, etc.

The client device 110 displays a graphical user interface (GUI) illustrating the board and the pieces on the board. The graphical user interface is also configured to receive inputs, e.g., including selection or pieces to be moved, fields to move selected pieces to, etc.

The client device 110, for each piece of an active player, identifies 920 valid moves. The client device 110 may perform the legal move check 600 of FIG. 6 using the game state obtained in step 910. In some embodiments, the game state already comprises the valid moves for the pieces. Precalculation and caching of the valid moves (i.e., pruning the tree of calculations) improves latency in illustrating the valid moves.

The client device 110 receives 930 a selection of a piece from the active player. The active player may select a piece on the client device 110 to move that piece. The player selects the piece then selects the field to be moved to, thereby creating the move input that is processed by the game engine 150.

The client device 110 illustrates 940 the valid moves for the selected piece. The valid moves may be denoted on the board displayed on a graphical user interface generated by the client device 110. The client device 110 visually distinguishes the fields corresponding to the valid moves, e.g., placing a symbol or other visual indicator placed on a field, highlighting a field in a different color, drawing a border around a field, or any other visual distinction from other fields that correspond to invalid moves, etc.

The valid move illustration 900 by the client device 110 provides an improved gaming experience that allows for a player to quickly identify valid moves for the piece. With illustrating valid moves, the player will be less likely to provide invalid move inputs. In other embodiments, the client device 110 may restrict out invalid moves from being played. Cutting out the player fumbling around with invalid moves speeds up the gameplay allowing for competitive play in quick time controls.

Exemplary General Computing System

Figure 10:
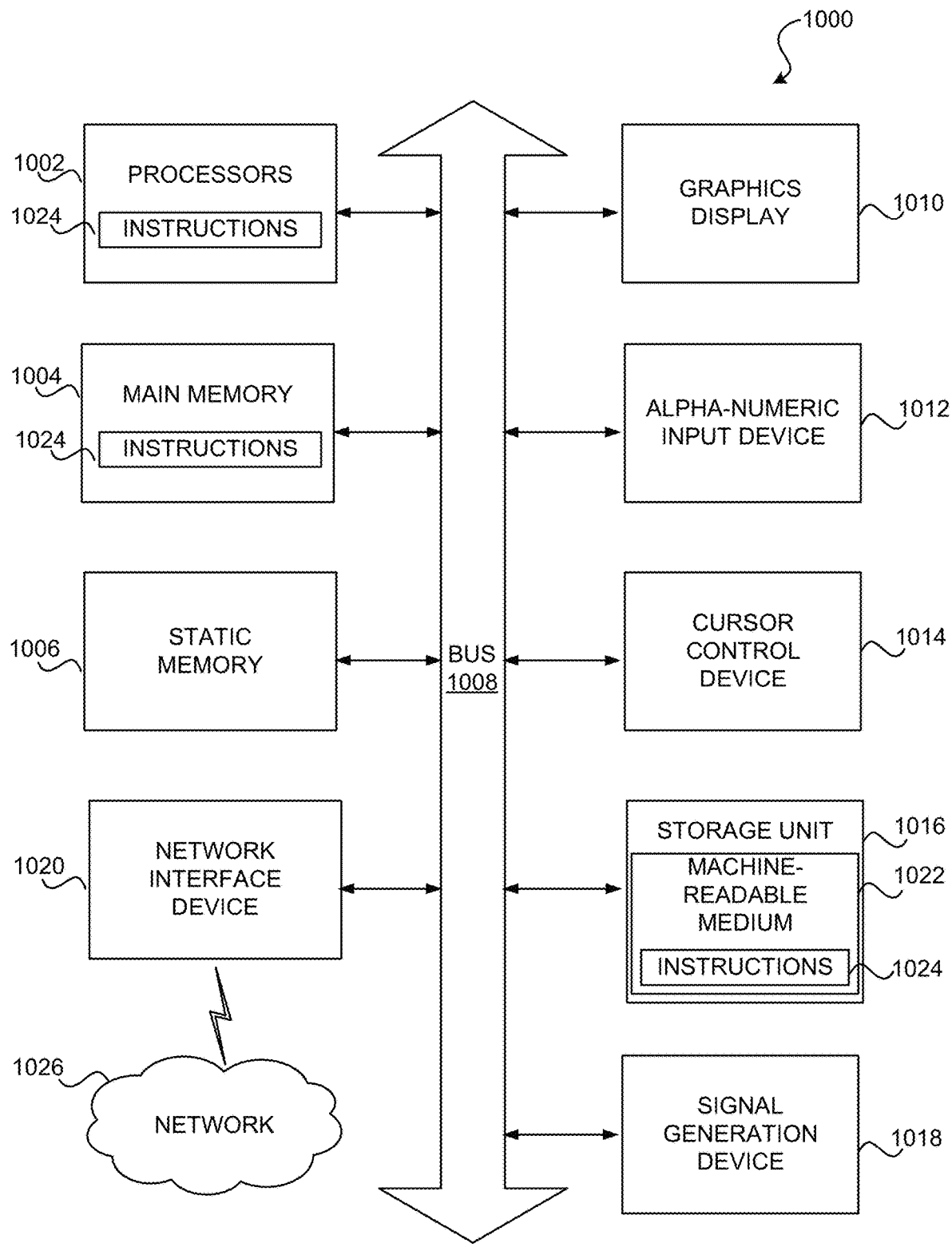
FIG. 10 illustrates an example general computing system, according to one or more embodiments.

FIG. 10 illustrates an example general computing system, according to one or more embodiments. Although FIG. 10 depicts a high-level block diagram illustrating physical components of a computer used as part or all of one or more entities described herein, in accordance with an embodiment, a computer may have additional, less, or variations of the components provided in FIG. 10. Although FIG. 10 depicts a computer 1000, the figure is intended as functional description of the various features which may be present in computer systems than as a structural schematic of the implementations described herein. In practice, and as recognized by those of ordinary skill in the art, items shown separately could be combined and some items could be separated.

Illustrated in FIG. 10 are at least one processor 1002 coupled to a chipset 1004. Also coupled to the chipset 1004 are a memory 1006, a storage device 1008, a keyboard 1010, a graphics adapter 1012, a pointing device 1014, and a network adapter 1016. A display 1018 is coupled to the graphics adapter 1012. In one embodiment, the functionality of the chipset 1004 is provided by a memory controller hub 1020 and an I/O hub 1022. In another embodiment, the memory 1006 is coupled directly to the processor 1002 instead of the chipset 1004. In some embodiments, the computer 1000 includes one or more communication buses for interconnecting these components. The one or more communication buses optionally include circuitry (sometimes called a chipset) that interconnects and controls communications between system components.

The storage device 1008 is any non-transitory computer-readable storage medium, such as a hard drive, compact disk read-only memory (CD-ROM), DVD, or a solid-state memory device or other optical storage, magnetic cassettes, magnetic tape, magnetic disk storage or other magnetic storage devices, magnetic disk storage devices, optical disk storage devices, flash memory devices, or other non-volatile solid state storage devices. Such a storage device 1008 can also be referred to as persistent memory. The pointing device 1014 may be a mouse, track ball, or other type of pointing device, and is used in combination with the keyboard 1010 to input data into the computer 1000. The graphics adapter 1012 displays images and other information on the display 1018. The network adapter 1016 couples the computer 1000 to a local or wide area network.

The memory 1006 holds instructions and data used by the processor 1002. The memory 1006 can be non-persistent memory, examples of which include high-speed random access memory, such as DRAM, SRAM, DDR RAM, ROM, EEPROM, flash memory.

As is known in the art, a computer 1000 can have different or other components than those shown in FIG. 10. In addition, the computer 1000 can lack certain illustrated components. In one embodiment, a computer 1000 acting as a server may lack a keyboard 1010, pointing device 1014, graphics adapter 1012, or display 1018. Moreover, the storage device 1008 can be local or remote from the computer 1000 (such as embodied within a storage area network (SAN)).

As is known in the art, the computer 1000 is adapted to execute computer program modules for providing functionality described herein. As used herein, the term "module" refers to computer program logic utilized to provide the specified functionality. Thus, a module can be implemented in hardware, firmware, or software. In one embodiment, program modules are stored on the storage device 1008, loaded into the memory 1006, and executed by the processor 1002.

ADDITIONAL CONSIDERATIONS

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for verifying an account with an on-line service provider corresponds to a genuine business. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed. The scope of protection should be limited only by the following claims.

What is claimed is:

1. A computer-implemented method for speeding up a computation of a determination of a player-eliminating condition in a turn-based computer game with three or more players by reducing a number of branches of calculation in the computation, the computer-implemented method comprising:
obtaining a game state of the turn-based computer game describing positions of pieces and a plurality of branches of calculations for movement of the pieces;

receiving a move from a first player that puts a second player's captain piece in check;
determining whether the move from the first player results in the player-eliminating condition against the second player, wherein the determination comprises:
  removing a first set of branches of calculations that include the second player moving the second player's captain piece to a place that puts the captain piece in other check;
  removing a second set of branches of calculations that include the second player moving any of the second player's non-captain piece that results in the captain piece in other check;
  evaluating how many checks the captain piece is in; and
  in response to determining the captain piece is in more than one check, removing a third set of branches of calculations that include the second player moving any of the second player's army pieces to protect the captain piece;
receiving, via a client device of the second player displaying a graphical user interface, selection of a piece of the second player to move; and
illustrating, via the graphical user interface, valid moves of the selected piece.

2. The computer-implemented method of claim 1, wherein the game state further describes information on the pieces, including any check on any captain piece of the players.

3. The computer-implemented method of claim 1, further comprising:
  retaining a subset of branches of calculations under the first set of branches of calculation, wherein the subset of branches of calculations include captain piece moves placing the captain piece of the second player in an attack of an inactive captain piece.

4. The computer-implemented method of claim 1, wherein the valid moves for the selected piece include moves that capture an enemy piece.

5. The computer-implemented method of claim 1, wherein illustrating, via the graphical user interface, the valid moves comprises visually identifying fields of the valid moves for the selected piece.

6. The computer-implemented method of claim 5, wherein visually identifying the fields comprises one or more of:
  placing a symbol on each of the fields;
  highlighting the fields; and
  bordering the fields.

7. The computer-implemented method of claim 5, further comprising:
  receiving, via the graphical user interface, a move input comprising the selected piece and a field to move the selected piece to.

8. The computer-implemented method of claim 7, further comprising:
  updating the game state upon validating the move input.

9. A non-transitory computer-readable storage medium storing instructions for speeding up a computation of a determination of a player-eliminating condition in a turn-based computer game with three or more players by reducing a number of branches of calculation in the computation, the instructions that, when executed by a computer processor, cause the computer processor to perform operations comprising:

obtaining a game state of the turn-based computer game describing positions of pieces and a plurality of branches of calculations for movement of the pieces;
receiving a move from a first player that puts a second player's captain piece in check;
determining whether the move from the first player results in the player-eliminating condition against the second player, wherein the determination comprises:
  removing a first set of branches of calculations that include the second player moving the second player's captain piece to a place that puts the captain piece in other check;
  removing a second set of branches of calculations that include the second player moving any of the second player's non-captain piece that results in the captain piece in other check;
  evaluating how many checks the captain piece is in; and
  in response to determining the captain piece is in more than one check, removing a third set of branches of calculations that include the second player moving any of the second player's army pieces to protect the captain piece;
receiving, via a client device of the second player displaying a graphical user interface, selection of a piece of the second player to move; and
illustrating, via the graphical user interface, valid moves of the selected piece.

10. The non-transitory computer-readable storage medium of claim 9, wherein the game state further describes information on the pieces, including any check on any captain piece of the players.

11. The non-transitory computer-readable storage medium of claim 9, the operations further comprising:
  retaining a subset of branches of calculations under the first set of branches of calculation, wherein the subset of branches of calculations include captain piece moves placing the captain piece of the second player in an attack of an inactive captain piece.

12. The non-transitory computer-readable storage medium of claim 9, wherein the valid moves for the selected piece include moves that capture an enemy piece.

13. The non-transitory computer-readable storage medium of claim 9, wherein illustrating, via the graphical user interface, the valid moves comprises visually identifying fields of the valid moves for the selected piece.

14. The non-transitory computer-readable storage medium of claim 13, wherein visually identifying the fields comprises one or more of:
  placing a symbol on each of the fields;
  highlighting the fields; and
  bordering the fields.

15. The non-transitory computer-readable storage medium of claim 13, the operations further comprising:
  receiving, via the graphical user interface, a move input comprising the selected piece and a field to move the selected piece to.

16. The non-transitory computer-readable storage medium of claim 15, the operations further comprising:
  updating the game state upon validating the move input.

17. A system for speeding up a computation of a determination of a player-eliminating condition in a turn-based computer game with three or more players by reducing a number of branches of calculation in the computation, the system comprising:
  a server comprising a computer processor and a non-transitory computer-readable storage medium storing instructions that, when executed by the computer processor, cause the computer processor to:

obtain a game state of the turn-based computer game describing positions of pieces and a plurality of branches of calculations for movement of the pieces, receive a move from a first player that puts a second player's captain piece in check, and determine whether the move from the first player results in the player-eliminating condition against the second player, wherein the determination comprises:

removing a first set of branches of calculations that include the second player moving the second player's captain piece to a place that puts the captain piece in other check, removing a second set of branches of calculations that include the second player moving any of the second player's non-captain piece that results in the captain piece in other check, evaluating how many checks the captain piece is in, and in response to determining the captain piece is in more than one check, removing a third set of branches of calculations that include the second player moving any of the second player's army pieces to protect the captain piece; and a graphical user interface in communication with the server, the graphical user interface configured to:

receive selection of a piece of the second player to move; and illustrate valid moves of the selected piece.

18. The system of claim 17, wherein the valid moves for the selected piece include moves that capture an enemy piece.

19. The system of claim 17, wherein the graphical user interface being configured to illustrate the valid moves comprises being configured to visually identify fields of the valid moves for the selected piece.

20. The system of claim 17, wherein the graphical user interface is further configured to receive a move input comprising the selected piece and a field to move the selected piece to, and wherein the instructions further cause the computer processor to update the game state upon validating the move input.

* * * * *